April 1, 1958  W. E. SLAVENS ET AL  2,828,749
CORN HUSKING MECHANISM
Filed June 22, 1956

*INVENTORS*
WAYNE E. SLAVENS &
HOWARD C. HADLEY
BY
*ATTORNEYS*

United States Patent Office 2,828,749
Patented Apr. 1, 1958

2,828,749

CORN HUSKING MECHANISM

Wayne E. Slavens and Howard C. Hadley, Des Moines, Iowa, assignors to Deere Manufacturing Company, Dubuque, Iowa, a corporation of Iowa Application June 22, 1956, Serial No. 593,102

4 Claims. (Cl. 130—5)

This invention relates to a corn husking unit and more particularly to the ear positioning means provided within the husking unit.

In conventional type husking units of the present day there is normally provided a plurality of pairs of husking rolls running lengthwise of the unit. Each pair of husking rolls form between them an upwardly facing pocket or nip for receiving ears of corn lengthwise of the rolls. The rolls draw the husks on the ears downwardly as the ears of corn move axially along the rolls to be eventually discharged from the husking unit. Efficient operation of such a husking unit demands that an even flow of corn move along the husking rolls and also that the ears of corn be seated lengthwise in the nip of the rolls and not transverse or crosswise to them. The advantage of properly placing the ears on the rolls will result in more cleanly husked ears and will reduce the quantity of shelling in the husking unit.

It is therefore the primary object of this invention to provide ear positioning means of a new and novel nature in the husking unit which will serve to position the ears of corn lengthwise of the rolls and which will feature ear engaging means to grip the ears so as to prevent them from leaving the nip as they move through the husking unit.

It is also an object of this invention to so construct the ear positioning means or mechanism so that it may be cheaply produced efficiently operative, and easily maintained in operating condition.

Other objects and advantages of the invention will become apparent to those skilled in the art as the nature of the invention is better understood following a full understanding of its principles as shown and described in the following specification and accompanying drawings.

Figure 1:
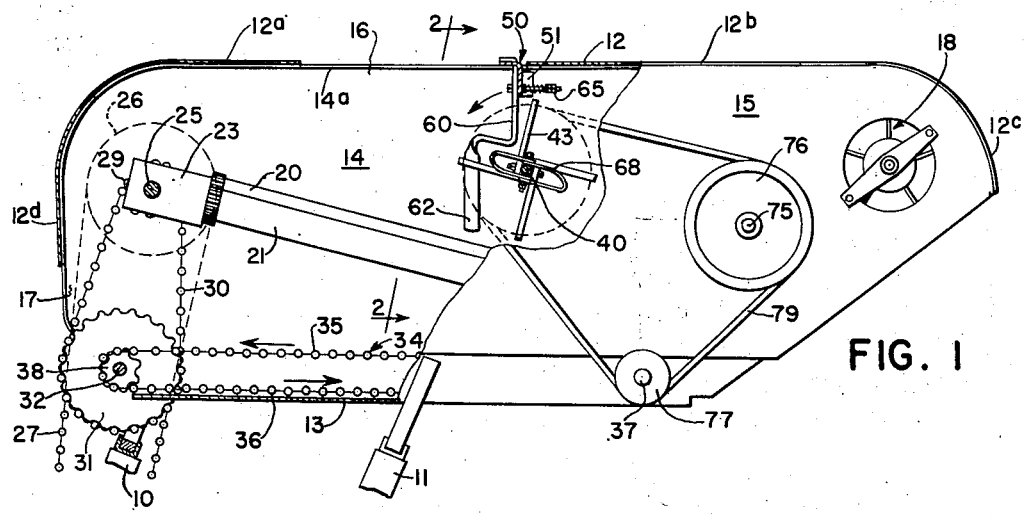
Fig. 1 is a side view of a husking unit with a portion of the side panel removed to more clearly illustrate the invention.

Reference numerals 10 and 11 indicate supporting framework for the husking unit. The supporting framework 10, 11 are a part of the general framework of a corn harvester although for purposes of this invention the husking unit could be a stationary unit. The husking unit comprises a unit housing structure having an upper panel 12 and a lower panel 13 interconnected at their opposite transverse edges by side panels 14, 15. The upper panel 12 is divided into two portions 12a, 12b which are spaced apart to provide an ear intake opening 16 in the top of the unit housing. The portion 12b is turned downwardly as at 12c to form with the side panels 14, 15 and the lower panel 13 an ear discharge opening, not shown, but located generally in the lower right end of the husking unit as shown in Fig. 1 which for purposes of explanation will be considered the forward end of the husking unit. The upper panel 12a is turned downwardly as at 12d to form with the side panels 14, 15 and the lower panel 13 a husk discharge opening 17 at the opposite end of the husking unit from the ear discharge opening.

Figure 2:
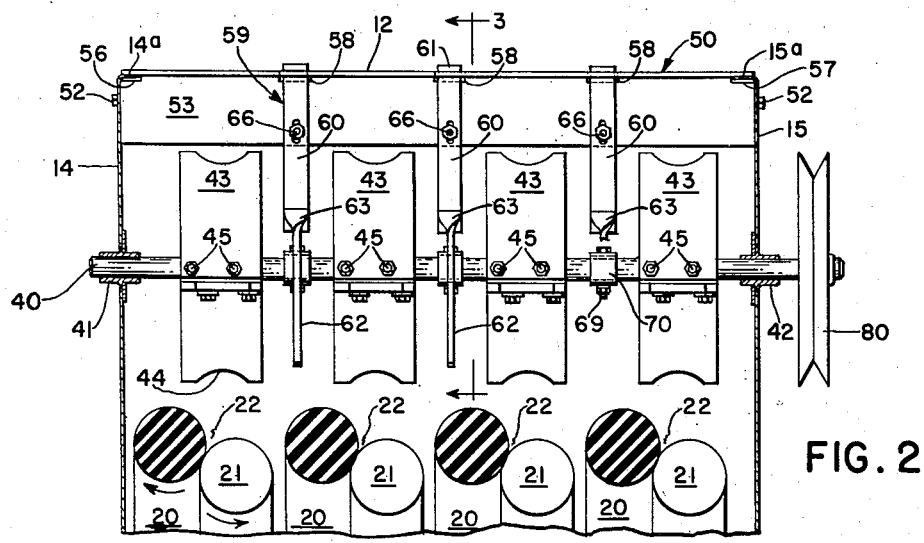
Fig. 2 is a sectional view taken along the line 2—2 of Fig. 1.
Figure 3:
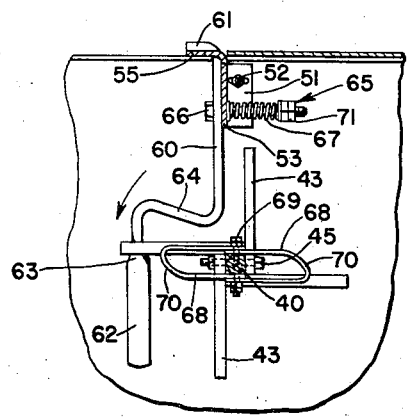
Fig. 3 is a sectional view taken along the line 3—3 of Fig. 2.

At the upper forward end of the husking unit is a blower indicated in its entirety by reference numeral 18, for blowing trash from the husking unit. Positioned internally of the unit housing are a plurality of pairs of cooperating husking rolls 20 and 21. The rolls of each pair are arranged so that the axes are parallel but in vertically offset relationship, and the rolls rotated in such direction as to travel respectively in the direction of the arrows (Fig. 2). The relationship between the rolls is such that there is defined an upwardly facing husking nip 22 running lengthwise of the pair of rolls. In the particular example of a husking mechanism shown, there are four pairs of rolls and consequently there will be four parallel nips 22. Each of the rolls 20 is shown conventionally as a rubber roll and the cooperating rolls 21 may be of wood or other material, these details being unimportant in the present instance. The rolls are conventionally intergeared, as indicated generally by the gear housing 23, at one end thereof to establish the driving relationship therebetween. The rolls are positioned under the intake opening 16 and are inclined towards the ear discharge opening at the right or forward end of the husking unit. The husking rolls 20, 21 are designed and so positioned so that the husking nip 22 is of such size as to carry individual ears of corn in the nip when the length of the ear is lengthwise of the nip. As the rolls rotate, they grip portions of the husk and as the ear advances along the rolls towards the ear discharge opening the husks should be removed to leave a relatively clean husked ear. In a perfect situation husking will be accomplished without shelling. However, in many instances, the ear will stand upright, butt end down, so that the butt is seized between the rolls, causing pinching of the ear to such extent as to cause excessive shelling at the butt end. This is due to the resistance of separation of the husks at the butt end when seized in a manner just described. Also, unless suitable means are provided, the ears will lie crosswise to the rolls and consequently incomplete husking will result.

A drive shaft 25 extends transversely through the husking unit housing and through the gear housing 23 and is journaled in the side panels 14, 15. The drive shaft 25 is driven by a large sprocket, shown in dotted representation as at 26 fixed to the shaft 25 and in turn is driven by a chain 27 which is driven by other drive means on the picking unit. Also mounted on the drive shaft 25 is a drive sprocket 29. Driven from the sprocket 29 by means of a chain 30 is a lower sprocket 31 which is mounted on and drives a husk conveyor drive shaft 32. A husk conveyor 34 is of an endless chain type and is mounted in the lower portion of the unit housing. The conveyor 34 is composed of upper and lower runs 35, 36, respectively, the upper run of which operates to receive the husks passing through the husking rolls 20, 21 to move them rearwardly through the discharge opening 17, and the lower run 36 of which moves adjacent the upper surface of the lower panel 13 and moves kernels of corn which have been dislodged from the ears in the husking process forwardly to the ear discharge opening. The conveyor 35 is mounted over suitable sprockets, as at 38, at the forward and rear ends of the husking unit and operates to drive the pulley drive shaft 37.

A rotatable shaft 40 positioned above and transverse to the husking rolls 20, 21 is journaled as at 41, and 42 in the vertical side panels 14, 15 of the unit housing. Mounted on the shaft 40 are ear engaging means in the form of flexible radial arms 43 composed of a rubberized material which is yieldable. The yieldable arms 43 are in vertical alinement with the nips 22 of the husking rolls and and are spaced angularly about the shaft 40 at 90° intervals. The arms 43 are held on the shaft 40 by bolts 45 which extend through the flexible arms and are threaded into the shaft 40. The outer end of the flexible arms 43 are formed with an ear engaging notch 44 also in vertical alinement with the nip 22. In operation the shaft will rotate in a counterclockwise direction, as shown in Fig. 1, and the flexible arms will move successively in roll-proximate positions to cause the notches 44 to engage the ears of corn positioned in the nips 22 so as to prevent their leaving the area of the nip.

An angle iron member 50 extends across the width of the unit housing and is flanged as at 51 on opposite ends. The flanges 51 lie adjacent to the side panels 14, 15 and are bolted thereto by the bolt and nut combinations 52. The angle iron member 50 includes a depending transverse leg portion 53, and a lateral leg portion 55 which lies in the plane of the upper panel 12, both the panel 12 and leg portion 55 being supported on upper lateral flanges 14a, 15a of the side panels 14, 15. The leg portion 53 is provided with slots 56, 57 at opposite ends to receive the flanges 14a, 15a.

Transversely spaced openings 58 are provided in the angle iron member 50 to received depending ear straightener members 59. Each ear straightener member 59 is composed of a metal strap having a vertical shank 60 with its upper end extending through the opening 59 and bent rearwardly as at 61 to lie adjacent to the lateral plate portion 55 of the angle iron member 50. The ear straightener member 59 also has a blade portion 62 which is formed integrally with the shank 60 by twisting the metal strap, as at 63, so that the narrow dimension is in a transverse direction relative to the rolls. The straightener 58 is stepped rearwardly as at 64 to permit the lower end of the blade portion 62 to depend in a position to the rear of the shaft 40 and proximate to the husking rolls.

Biasing means here indicated in its entirety by the reference numeral 65 is composed of a bolt 66 extending through the shank 60 and the vertical plate 53, a spring 67 surrounding the bolt 66 forwardly of the plate 53, and a washer and nut combination 71. The biasing means operates to mount the ear straightener 59 on the angle iron member 50 and to bias against or resist movement of the ear straightener in a rearward direction.

Also mounted on the shaft 40 in alternative spaced relationship to the radial arms 43 are cam means here in the form of a pair of bifurcated members 68 bolted to the shaft as at 69 and having a cam surface 70 spaced radially from the shaft 40 which are in lengthwise alinement with the shank 60 of the ear straightener.

It will be noted in viewing Fig. 2 that the radial arms 43 and the notches 44 are in substantially vertical alinement with the nip 22, whereas the ear straighteners 59 are offset transversely from the nips. In operation, therefore, as the shaft 40 rotates, any ears lying transverse to the rolls 20, 21 will be knocked lengthwise by the ear straighteners 59 and will also be prevented from positioning themselves other than in the nip or pocket 22 of the husking rolls. Reciprocating motion of the ear straighteners 59 will occur due to the cam surface 70 engaging the shank portion 60 of the ear straighteners so as to move the ear straightener rearwardly and by the biasing means 65 which will resist rearward movement of the ear straightener and will cause the ear straighteners, upon disengagement with the cam surfaces 70, to return to their vertical depending position. As the ears of corn move under the shaft 40 the radial arms 43 and specifically the notches 44 will ride against the upper surface of the ears so as to hold the ears in the nip of the husking rolls 20, 21. The radial arms 43 being made of a yieldable material will apply a pressure to the top surface of the ears which will provide better husking contact between the rolls and the ears as the ears move along the husking rolls.

It should here be noted that in the example shown in Fig. 1 there is provided a pair of ear positioning means, one, which has here been described and illustrated, being positioned at the rear or proximate to the ear receiving opening 16 and the other, not shown but indicated as to its general locality by the drive shaft 75 and a pulley 76, being positioned at the forward end of the husking unit. Any number of ear positioning means may be incorporated in a husking unit, the limitation depending entirely upon the space available and the capacity of the husking unit.

The power for operating the ear positioning means is provided by means of a V-belt drive driven from the shaft 37 and comprising a drive pulley 77 on the shaft 37, the pulley 76, a pulley 80 on the outer end of the drive shaft 40, and a V-belt 79 threaded over the aforesaid pulleys.

While only one form of the invention has been shown it should be recognized that other forms and variations could exist without departing basically from the general principles disclosed. It should therefore be understood that while the preferred embodiments of the invention have been described with the view of clearly and concisely illustrating its principles, it is desired not to so limit or narrow the invention beyond that which is presently claimed.

What is claimed is:

1. In a corn husking unit having an elongated housing structure with an ear receiving opening and an ear discharge opening, and a plurality of adjacent and parallel pairs of husking rolls contained in the housing structure, the rolls in each pair lying in side by side relation to define an upwardly facing husking nip running lengthwise thereof to support an ear of corn parallel thereto, ear positioning means comprising: a rotatable shaft supported by the housing structure above and transverse to the axes of the husking rolls; transversely spaced depending members mounted on the housing structure for lengthwise movement relative to the husking rolls, each of said members having its lower end proximate to the husking rolls and transversely offset from the nip, and a midportion thereof proximate to the shaft; radial arm means transversely spaced on the shaft including ear engaging means, each ear engaging means being composed of a flexible and yieldable material and having an ear engaging notch at its outer end in vertical alinement with a nip, and operative upon rotation of the shaft to engage the ears as they move lengthwise of the rolls to prevent their leaving the nip; cam means alternately spaced with the ear engaging means along the shaft and operative upon rotation of the shaft to engage the depending members to cause the lower ends thereof to reciprocate lengthwise of the rolls to align the ears lengthwise relative to the rolls; and drive means for causing rotation of the shaft.

2. In a corn husking unit having an elongated housing structure with an ear receiving opening and an ear discharge opening, and a plurality of adjacent and parallel pairs of husking rolls contained in the housing structure, the rolls in each pair lying in side by side relation to define an upwardly facing husking nip running lengthwise thereof to support an ear of corn parallel thereto, ear positioning means comprising: a rotatable shaft supported by the housing structure above and transverse to the axes of the husking rolls; transversely spaced depending members mounted on the housing structure for lengthwise movement relative to the husking rolls and biased against movement in one direction, each of said members having its lower end proximate to the husking rolls and transversely offset from the nip, and a mid-portion thereof proximate to the shaft; radial arm means transversely spaced on the shaft including ear engaging means, each ear engaging means being composed of a flexible and yieldable material and having an ear engaging notch at its outer end in vertical alinement with a nip, and operative upon rotation of the shaft to engage the ears as they move lengthwise of the rolls to prevent their leaving the nip; and cam means alternately spaced with the ear engaging means along the shaft and operative upon rotation of the shaft to engage the depending members to cause the lower ends thereof to move in said one direction to align the ears lengthwise relative to the rolls.

3. In a corn husking unit having an elongated housing structure with an ear receiving opening and an ear discharge opening, and a plurality of adjacent and parallel pairs of husking rolls contained in the housing structure, the rolls in each pair lying in side by side relation to define an upwardly facing husking nip running lengthwise thereof to support an ear of corn parallel thereto, ear positioning means comprising: a rotatable shaft supported by the housing structure above and transverse to the axes of the husking rolls; transversely spaced depending members mounted on the housing structure for lengthwise movement relative to the husking rolls and biased against movement in one direction, each of said members having its lower end proximate to the husking rolls and transversely offset from the nip, and a mid-portion thereof proximate to the shaft; radial arm means transversely spaced on the shaft including ear engaging means operative upon rotation of the shaft to engage the ears as they move lengthwise of the rolls to prevent their leaving the nip; and cam means alternately spaced with the ear engaging means along the shaft and operative upon rotation of the shaft to engage the depending members to cause the lower ends thereof to move in said one direction to align the ears lengthwise relative to the rolls.

4. In a corn husking unit having housing structure, a pair of husking rolls contained in the housing structure lying in side by side relation to define an upwardly facing husking nip running lengthwise thereof to support an ear of corn parallel thereto, ear positioning means comprising: a rotatable shaft supported by the housing structure above and transverse to the axes of the husking rolls; a depending member mounted on the housing structure for lengthwise movement relative to the husking rolls, said member having its lower end proximate to the husking rolls offset transversely from the nip and a portion thereof proximate to the shaft; radial arm means on the shaft operative upon rotation of the shaft to engage the ears as they move lengthwise of the rolls to prevent their leaving the nip; and cam means on the shaft operative upon rotation of the shaft to engage the depending member to cause the lower end thereof to reciprocate lengthwise of the rolls to align the ears lengthwise relative to the rolls.

References Cited in the file of this patent
UNITED STATES PATENTS

| | | |
|---|---|---|
| 735,308 | Snyder | Aug. 4, 1903 |
| 736,785 | Ross | Aug. 18, 1903 |
| 1,202,117 | Stone | Oct. 24, 1916 |
| 2,286,279 | Hyman et al. | June 16, 1942 |